Sept. 16, 1924.  1,508,870
O. BENNETT
ELECTRICALLY OPERATED TELEGRAPHIC TYPEWRITING SYSTEM
Filed May 27, 1922    11 Sheets-Sheet 1

Inventor.
Orin Bennett.
By Cicero & Totten
Attorneys.

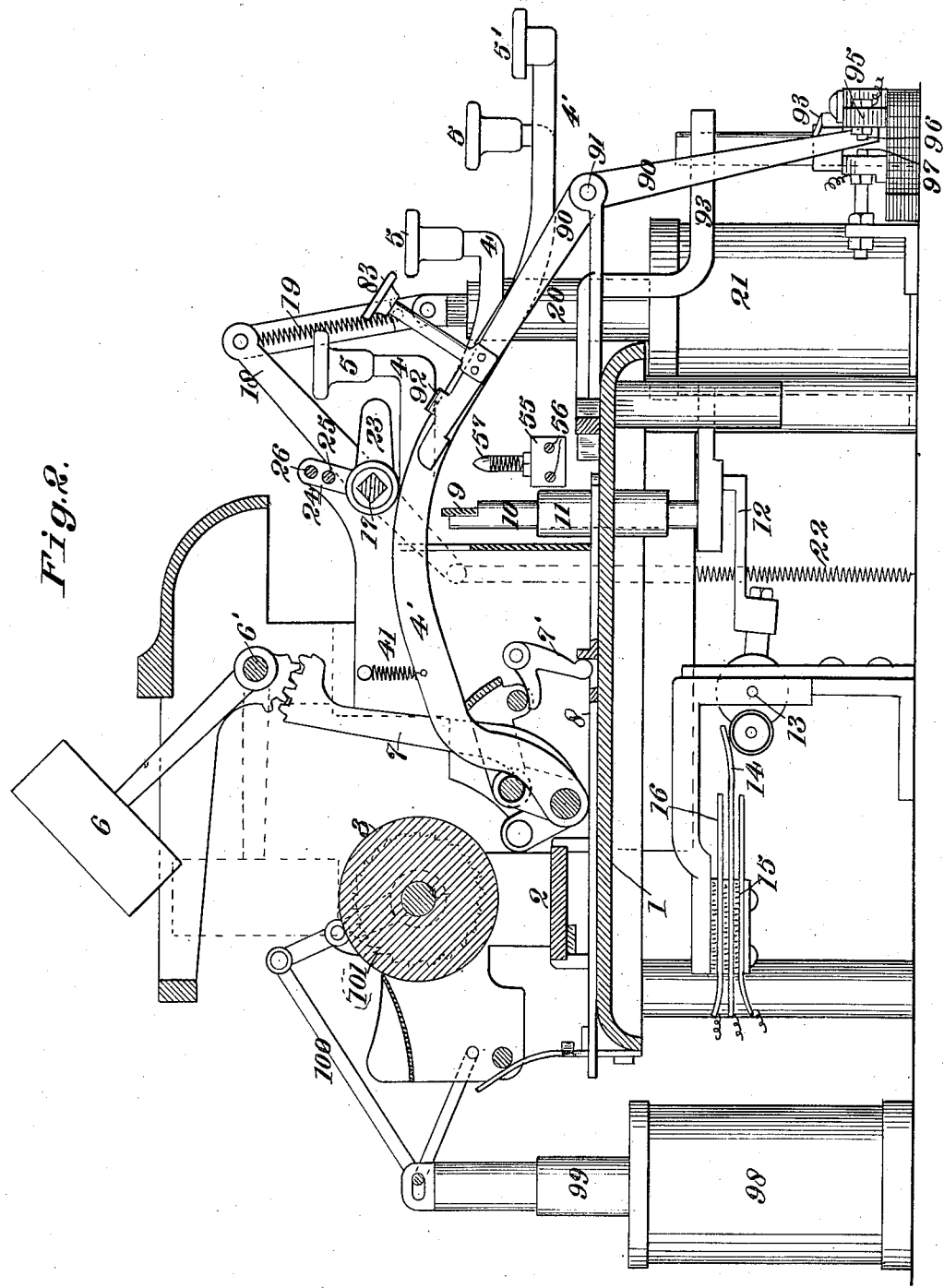

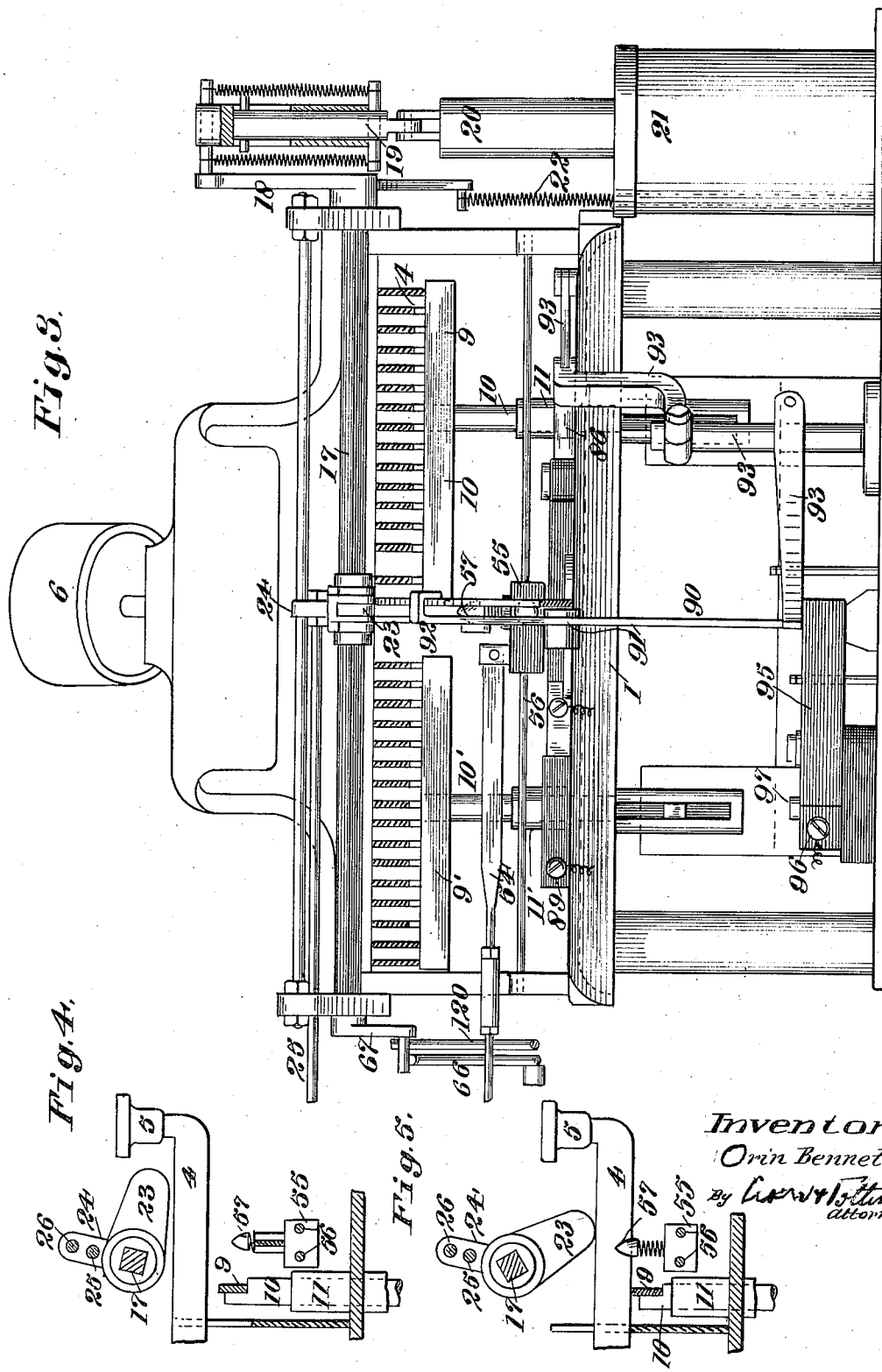

Sept. 16, 1924.　　　　　　　　　　　　　　　　　1,508,870
O. BENNETT
ELECTRICALLY OPERATED TELEGRAPHIC TYPEWRITING SYSTEM
Filed May 27, 1922　　　11 Sheets-Sheet 6
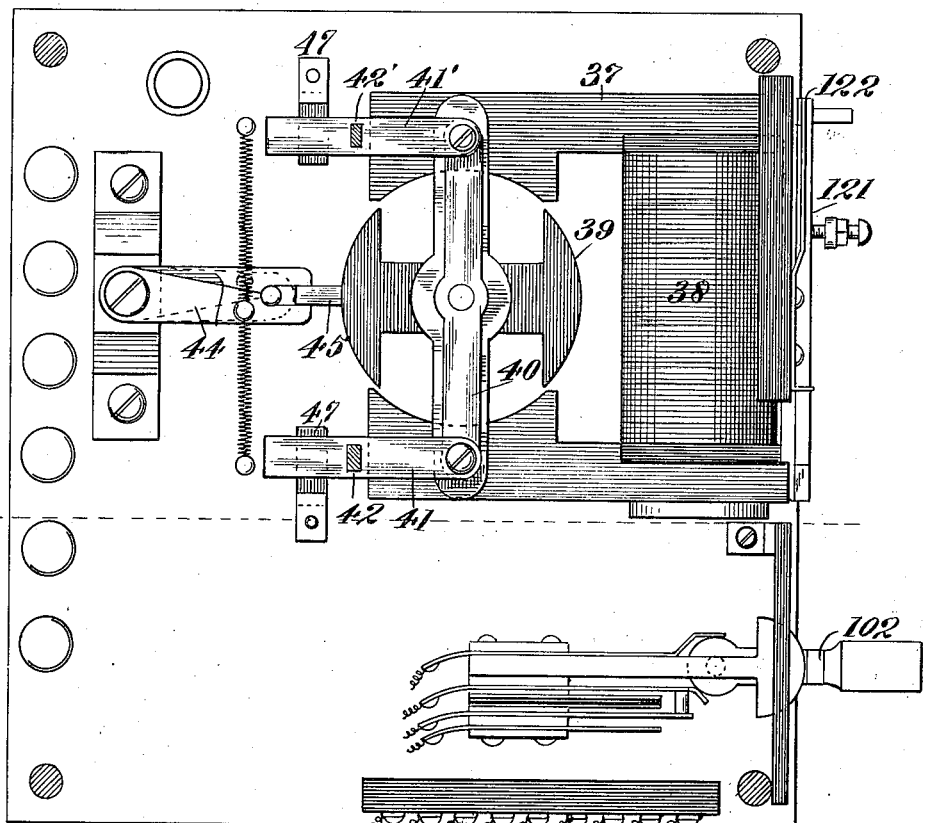
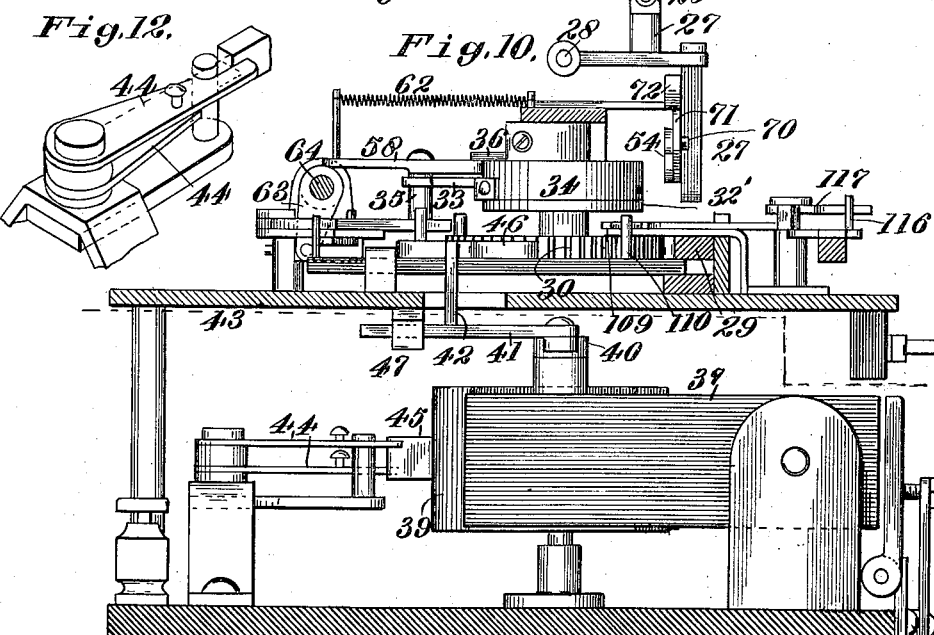
Inventor
Orin Bennett
By A. Kier Totten Attorney Sept. 16, 1924. 1,508,870
O. BENNETT
ELECTRICALLY OPERATED TELEGRAPHIC TYPEWRITING SYSTEM
Filed May 27, 1922  11 Sheets-Sheet 7
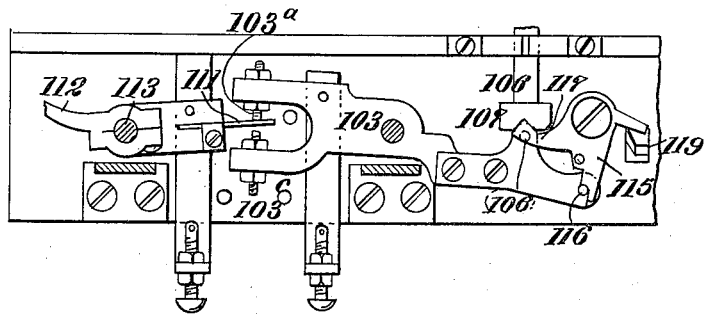
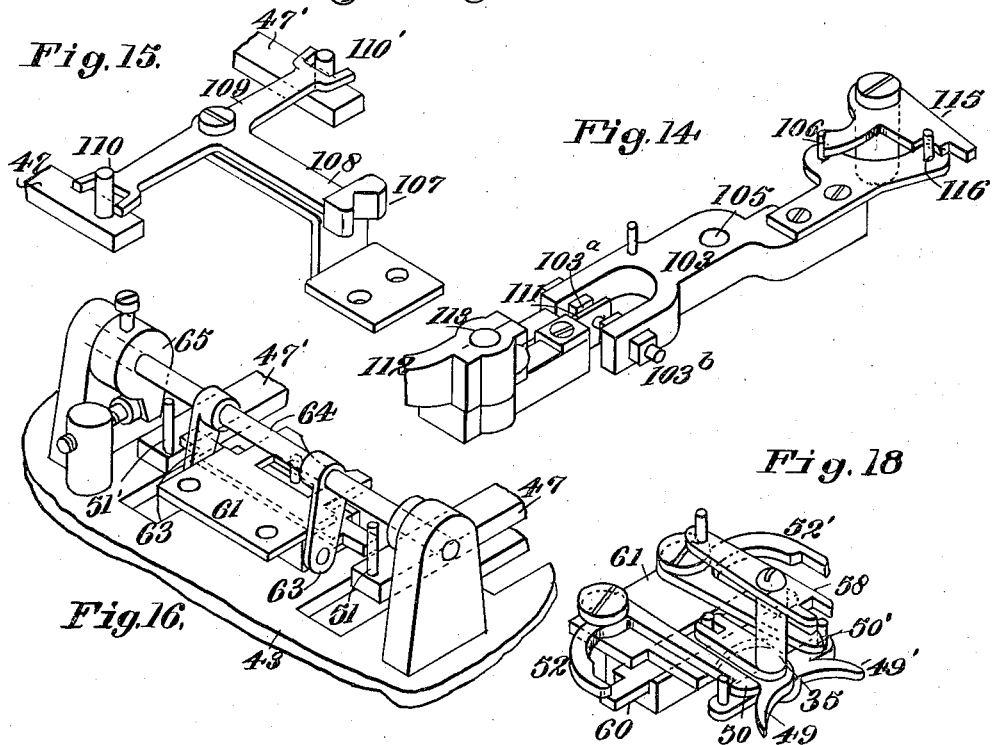
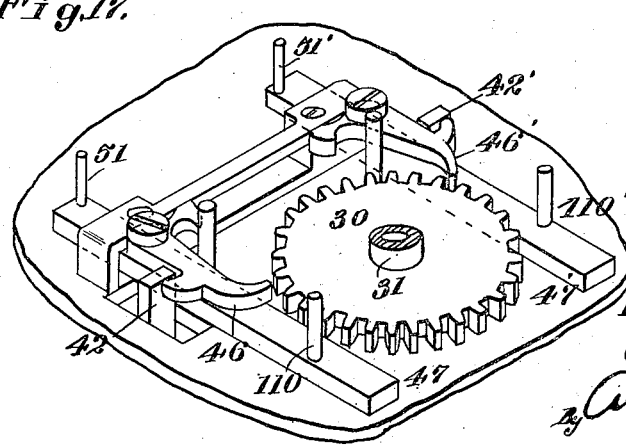
Inventor.
Orin Bennett Sept. 16, 1924. 1,508,870
O. BENNETT
ELECTRICALLY OPERATED TELEGRAPHIC TYPEWRITING SYSTEM
Filed May 27, 1922   11 Sheets-Sheet 8
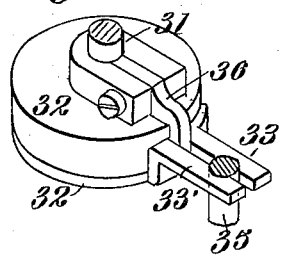
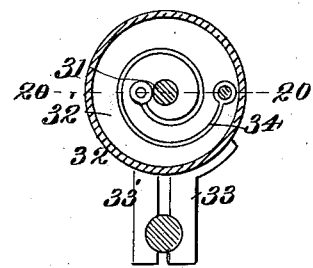
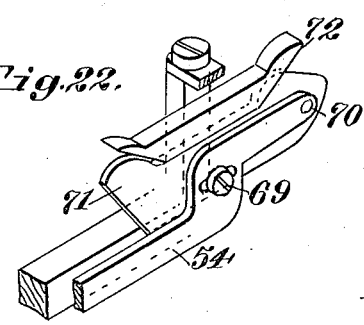
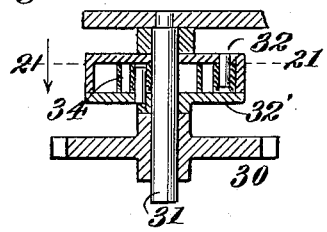
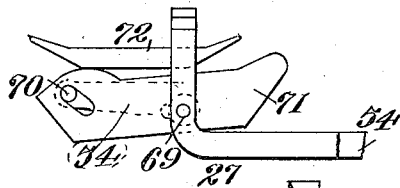
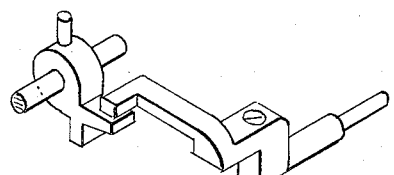
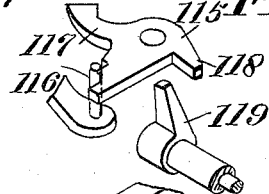
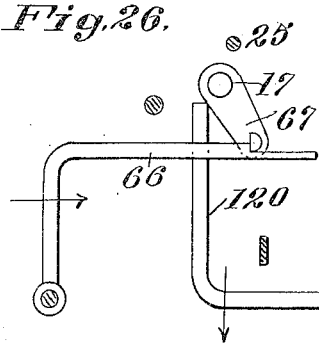
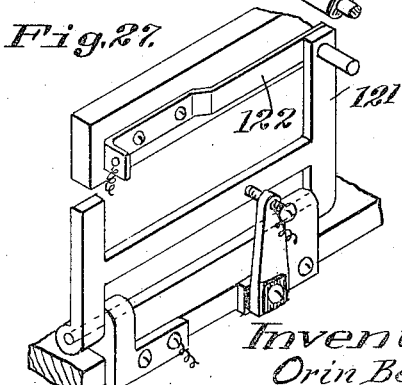
Inventor.
Orin Bennett
By Cicker & Totten
Attorneys.

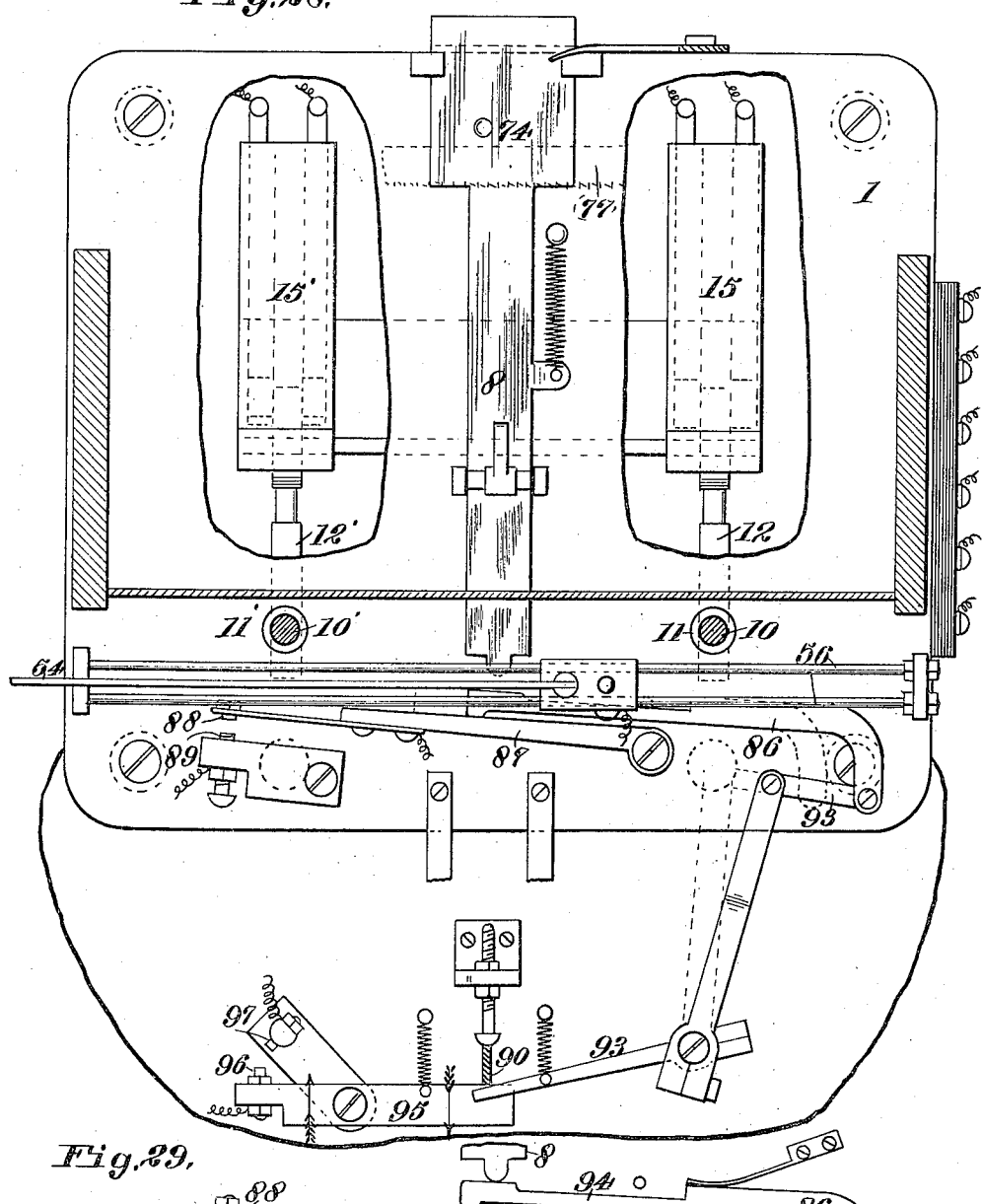

Sept. 16, 1924.
O. BENNETT
1,508,870
ELECTRICALLY OPERATED TELEGRAPHIC TYPEWRITING SYSTEM
Filed May 27, 1922  11 Sheets-Sheet 10
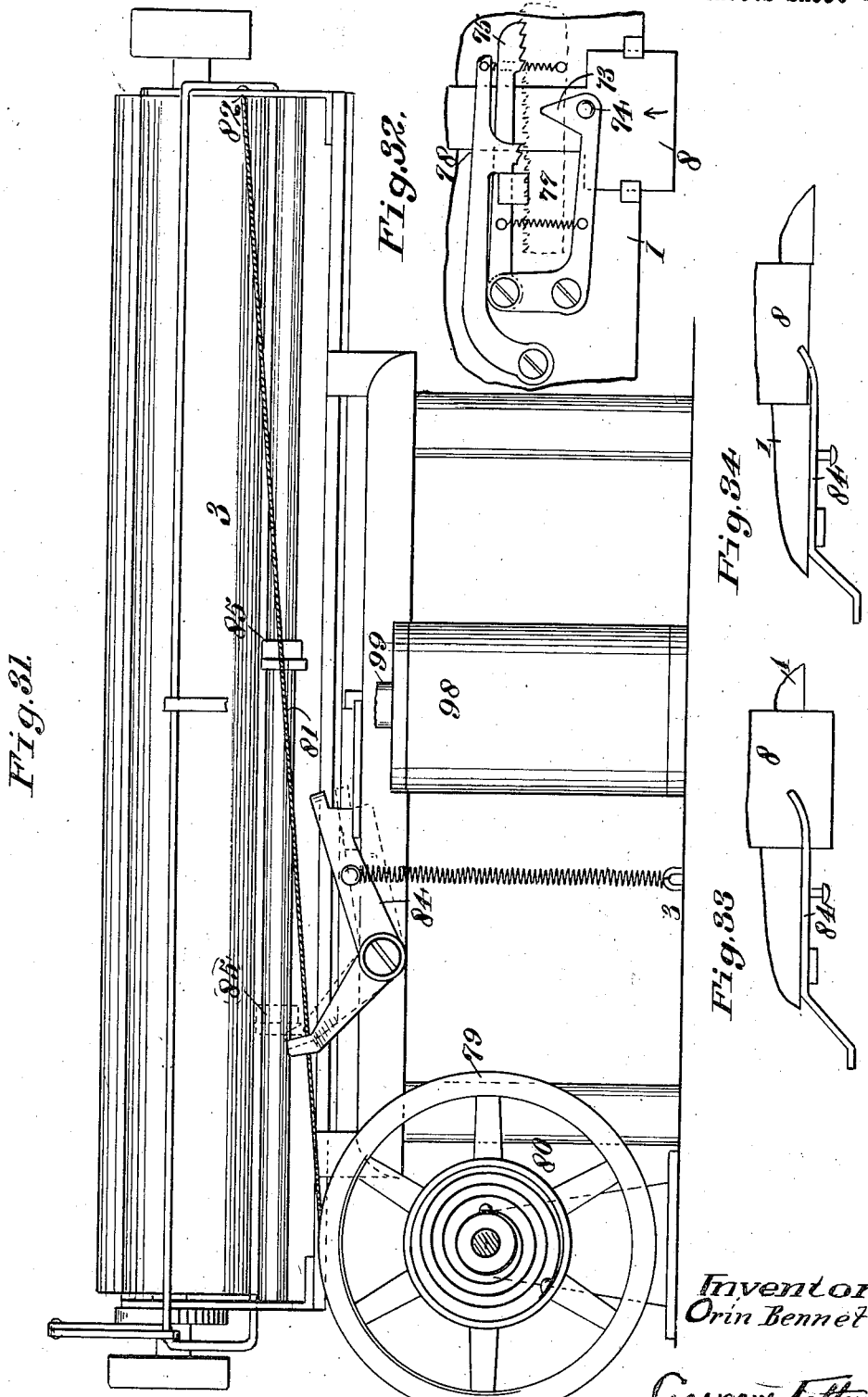
Inventor.
Orin Bennett
By Ackerv + Totten,
Attorneys

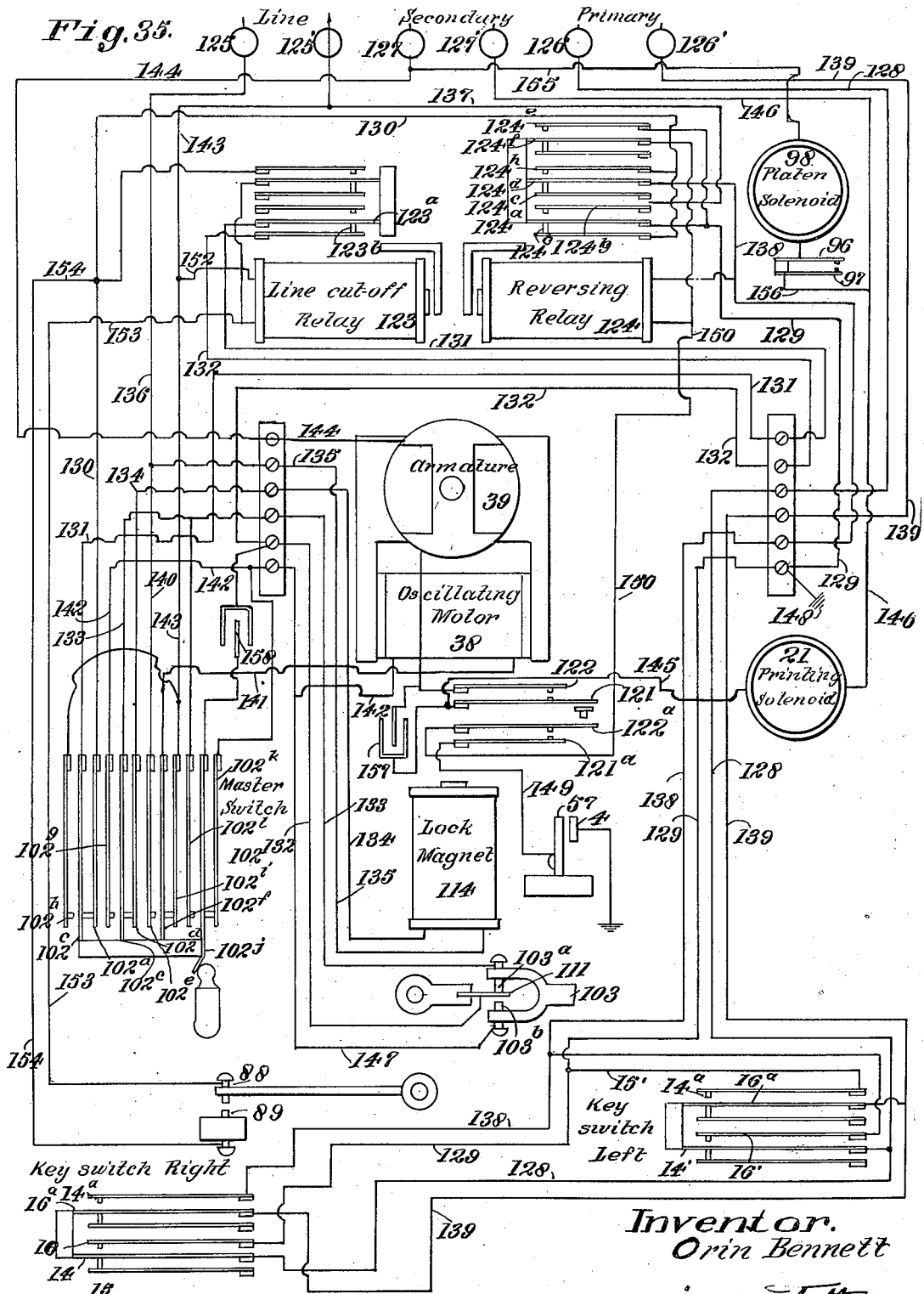

Patented Sept. 16, 1924.

1,508,870

UNITED STATES PATENT OFFICE.

ORIN BENNETT, OF SAN FRANCISCO, CALIFORNIA, ASSIGNOR TO PACIFIC COAST TYPEWRITER CO., OF SAN FRANCISCO, CALIFORNIA, A CORPORATION OF CALIFORNIA.

ELECTRICALLY-OPERATED TELEGRAPHIC TYPEWRITING SYSTEM.

Application filed May 27, 1922. Serial No. 564,013.

*To all whom it may concern:*

Be it known that I, ORIN BENNETT, a citizen of the United States, residing in the city and county of San Francisco and State of California have invented certain new and useful Improvements in Electrically-Operated Telegraphic Typewriting Systems, of which the following is a specification.

The present invention relates to apparatus for the transmission of written messages by electrically operated means.

The principal object of the invention is to provide a printing telegraphic apparatus in which the possibility of error in the transmission of messages is reduced to a minimum. Other objects will become apparent from the following description of the invention.

Broadly speaking, the preferred embodiment of my invention comprises two or more identical machines, each having a key-board and a printing mechanism similar to those of a well-known form of typewriter, and each being capable of either sending or receiving messages, at the will of the operator. The machines are connected together by a simple electric circuit comprising two wires or their equivalent, and whatever devices, such as relays, etc. as may be rendered necessary by the distance between the machines and the length of the line. Any machine may be the sender, the others being the receivers. To avoid duplication in the following description, one machine only is described and illustrated, and in the description of the operation of the complete apparatus, the simplest possible form, including only two machines, either of which may be the sender and the other the receiver, will be used by way of example, it being understood that any number of similar machines may be included in the transmitting circuit. Moreover, it is to be understood that changes, within the scope of the appended claims, may be made in the form and construction of the machine itself and its electrical connections and circuits, without departing from the spirit of the invention as expressed in said claims.

The attainment of the principal object stated above, viz, the practical elimination of error, is brought about by providing a mutual inter-dependence between the sending and receiving machines. Thus the printing mechanism of the receiving machine is controlled by the key-board of the sending machine, but the printing mechanism of the sending machine, instead of being controlled by its own key-board, is controlled by the operation of the printing mechanism of the receiving machine. Therefore, if for any reason the printing mechanism of the receiving machine responds falsely to the keyboard of the sending machine, the printing mechanism of said sending machine, if it responds at all, will print the same false letter that was printed by the receiving machine, thus warning the sending operator at once that an error has occurred. In most cases of trouble of any kind, either mechanical or electrical, the entire mechanism is so locked as to prevent further operation until the cause of the trouble has been ascertained and removed.

In the preferred embodiment of my invention, I make use of a writing machine of the well-known type in which the type characters are formed upon the outer surface of a cylindrical body or wheel, and are selected by the rotation of said wheel, such movement being caused by the partial operation of the keys. The printing of the selected letter is then accomplished by the further movement of the same key, through suitable mechanism which causes the type wheel to move bodily down upon the paper, which is carried upon a platen roller mounted in the usual laterally movable carriage. The mechanical construction of such machines, which is well-known, forms no part of the present invention, and therefore has been omitted from the drawings, and the following description, except in so far as is necessary properly to illustrate and describe the novel mechanical and electrical features constituting the said invention.

Before proceeding with a more detailed description of the invention, it will be necessary to outline the general principles of its preferred construction, as follows:—the manual operation of any given key on the sending machine closes an electric circuit which sets in motion the selecting mechanism of the receiving machine. Said selecting mechanism operates by a series of automatic and successive steps, and each step motion of the receiving machine causes a similar and corresponding action in the selecting mechanism of the sending machine. When this selecting operation, which requires but a very short interval of time, is completed in both machines, other circuits are automatically closed, which cause the proper keys of both machines to be fully depressed, thereby printing the letter, through the ordinary mechanical action of the machines. The selecting mechanism of both machines then returns to the normal position, and their platen carriages are advanced the space of one letter. The electric circuits are so arranged that the selecting operation, when once initiated, proceeds automatically in both machines to proper completion, and cannot be interfered with by the premature depressing of another key. Moreover, the selecting mechanism of the sending machine is operated, not directly by its own key-board, but by the action of the selecting mechanism of the receiving machine, so that there is practically no possibility of the receiving machine printing a wrong letter without the sending machine doing likewise, and thus warning the sending operator of the error.

Each machine is provided with a master switch, by means of which it may be instantly changed from sending to receiving or vice versa. Likewise, each machine is equipped with suitable devices for returning the carriage and rotating the platen at the end of each line, all of which will be described later in detail.

With these preliminary statements in view, the preferred embodiment of my invention will now be more fully described with reference to the accompanying sheets of drawings, wherein:—

Fig. 2 is a transverse vertical section, enlarged, taken at the approximate center of the machine.

Fig. 3 is a longitudinal vertical section, viewed from the front, showing portions of the key-operating or printing mechanism.

Figs. 4 and 5 are detailed views of a portion of one key and its operating mechanism, the parts being shown respectively in inoperative and operative positions.

Fig. 10 is a part sectional end elevation of the same, taken approximately on the line 10—10 of Fig. 9 and viewed in the direction of the arrows.

Fig. 11 is a plan view of the oscillating motor, taken on the line 11—11 of Fig. 10.

Fig. 12 is a perspective detail of the centering device for the oscillating motor.

Figs. 13 and 14 are respectively a plan and a perspective of the contact lock.

Fig. 15 is a perspective detail of the lock release.

Fig. 16 is a perspective view of a portion of the selecting mechanism.

Fig. 17 is a perspective view of the escapement action of the selecting mechanism.

Fig. 18 is a perspective view of the escapement release mechanism.

Fig. 19 is a perspective view of the selector-return-spring case.

Fig. 20 is a vertical section of the same.

Fig. 21 is a sectional plan of the same, taken on the line 21—21 of Fig. 20.

Fig. 22 is a rear perspective detail of the controlling cam for the printing mechanism contact member.

Fig. 23 is a front elevation of the same.

Fig. 24 is a perspective detail of the lock holding latch.

Fig. 25 is a perspective detail of the printing mechanism release trigger.

Fig. 26 is an end elevation of the printing mechanism release latch.

Fig. 27 is a perspective detail of the motor field contact member.

Fig. 28 is a broken sectional plan of the under portion of the typewriter, showing the carriage advancing slide, the key switches, the contacts for operating the line cut-off relay, and contacts for operating the platen solenoid.

Figs. 29 and 30 are detailed plan views of the contacts for operating the line cut-off relay, showing the same in two different positions.

Fig. 31 is a rear elevation of the platen, the carriage, and its return mechanism.

Fig. 32 is a detailed plan view of the carriage advancing mechanism.

Figs. 33 and 34 are plan details of the carriage return dog, showing the same in two different positions.

Fig. 35 is a diagram of the various electric circuits of one complete machine.

Figure 1:
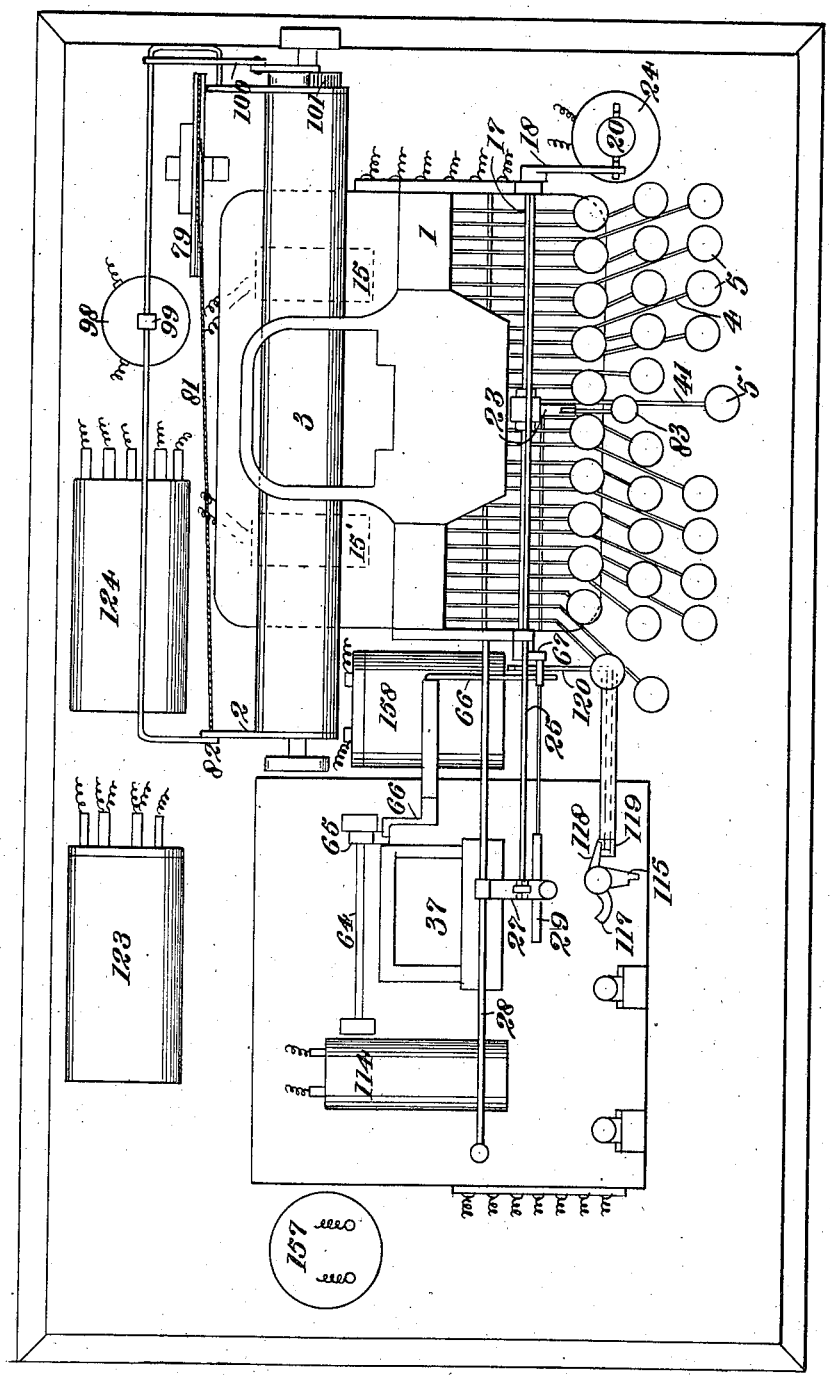
Fig. 1 is a plan view, mainly in outline, of my printing telegraph machine, the details of construction being largely omitted for the sake of clearness.

In the drawings, and referring for the present to Figs. 1, 2 and 3 thereof, the reference numeral 1 designates the frame of a typewriter, in which is mounted the usual carriage 2 carrying the platen roller 3. The bars 4 which carry the keys 5, Figs. 1 and 2, are connected with the type wheel 6 by mechanism which is conventionally illustrated in Fig. 2 and designated collectively by the numeral 7. This mechanism is of standard construction, and is well known in the art, and connects the key bars 4 with the type wheel 6 in such a manner that, when one of said key bars is depressed, said type wheel is first rotated to bring the type character corresponding to the particular operated key to the bottom, and is then swung about its fulcrum 6', descending and striking the platen roller 3, as indicated by the dotted lines, thereby printing the impression of the said type character upon the paper (not shown) which is carried upon said platen. It is understood that the type characters, which are not shown in the drawings, are formed upon the peripheral surface of the type wheel 6. The operation of a key bar 4 also causes, through the action of a connecting lever 7', a reciprocating movement of a horizontally disposed slide 8, said slide moving forwardly, or toward the right as viewed in Fig. 2, when the key is depressed, and returning when said key is released. This movement of the slide 8 advances the carriage 2 in a manner to be later described. Springs, one of which is shown at 4' are provided for returning the key bars 4 to their normal positions.

The connecting mechanism 7 is so arranged that the first portion of the downward movement of a key bar 4 has no effect on the type wheel 6. This initial movement of a key bar brings it into contact with a horizontal bar 9, Figs. 2 and 3, carried by a plunger 10 operating through a bushing 11. The lower end of said plunger bears upon a lever 12, Fig. 2, fulcrumed at 13, and whose other end operates the movable contact member 14 of a switch 15. Thus when the key is depressed for a portion of its travel, the plunger 10 is forced downward, and the contact 14 is raised to make electrical connection with a stationary contact 16. As shown in Fig. 3, the bar 9 extends under all key bars 4 on the right of the center of the keyboard, and a similar bar 9' extends under the left hand key bars. Said left hand bar 9' is carried by a plunger 10' operating in a guide 11', and controls a switch similar to the switch 15 described above. Said switches are indicated at 15 and 15' in Figs. 1 and 28, and their contacts and electrical connections are shown in Fig. 35 and will be described hereinafter.

It should be clearly understood that the manual operation of any given key 5 does nothing but operate the switch 15, (or 15' as the case may be). The electric circuits which are thereby energized cause the operation of mechanism which will be described presently, and which operates to further depress the same key which has been partially depressed by the operator, thereby causing the printing of the type character corresponding to that key. This action occurs in the sending machine, and at the same time the corresponding key of the receiving machine is also fully depressed, thereby printing the same character in both machines. In actual practice it may be convenient to provide a suitable stop or latch to limit the initial downward movement of the key of the sending machine to that necessary to operate the switch 15, or 15', said latch being later automatically released to allow the further downward movement of said key under the action of the electrically controlled operating mechanism. For the purposes of the present description, however, and in order to simplify the accompanying drawings, such stop mechanism has been omitted, it being understood that the operator, in using the machine as herewith illustrated, depresses the key only enough to operate the switch, but not enough to operate the printing mechanism, described above.

The mechanism which causes the above mentioned final and complete depression of the initially and partly depressed key will now be described with relation to the sending machine only, the connection between it and the receiving machine, and the controlling circuits therefor, being subsequently discussed. Referring to Figs. 1, 2 and 3, a horizontally disposed square shaft 17 extends over the entire series of key bars 4, and carries at its right hand end a crank 18 which is connected by a spring cushioned link 19, Figs. 2 and 3, with the core 20 of a solenoid 21, the latter being hereinafter referred to as the printing solenoid. Thus when said core 20 is drawn down by said solenoid 21, the shaft 17 is partially rotated. A spring 22 normally holds said shaft in the position shown.

Slidably mounted on the square shaft 17 is a cam 23, Figs. 1 to 5, which is adapted to be shifted to a position immediately above any one of the key bars 4, so that when said shaft 17 is turned by the printing solenoid 21, said cam 23 depresses the key bar above which it has been placed, as shown in Fig. 5, thereby causing the full operation of the printing mechanism.

The cam 23 is shifted upon the square shaft 17 by means of a trunnion arm 24, Figs. 2 to 5, which is connected with a sliding rod 25, and which travels upon a fixed rod 26, as a guide. Said sliding rod 25 extends beyond the left hand end of the machine, and is secured to a member 27, Figs. 1, 8, 9 and 10, which travels upon a fixed guide 28. Said member 27 extends downwardly, and is secured to a slidable rack bar 29, whose teeth mesh with a gear wheel 30, Figs. 6, 7, 8 and 10. The pitch of the teeth of the gear 30 and rack 29 is equal to the distance between two adjacent key bars 4 of the key board, all of which are equally spaced. The gear 30 is fixed upon a rotatable shaft 31, Figs. 6, 7, 19, 20 and 21, and upon said shaft, above said gear, is freely mounted a drum like chamber formed of two independent parts, a top 32 and a bottom 32'. Radially disposed arms 33 and 33' are secured respectively to the two parts 32 and 32' of said chamber, as shown in Figs. 10, 19 and 21. A spring 34, within said chamber, has one of its ends secured to each part 32 and 32' and normally holds said parts in such position that the arms 33 and 33' lie on either side of a fixed stop 35. The shaft 31 has fixed to it a radial arm 36 which extends downwardly between the arms 33 and 33', as shown in Fig. 19, so that when the gear 30 is rotated in either direction, it is opposed by the action of the spring 34, and will be returned by said spring to its normal position as shown in Fig. 8.

Figure 9:
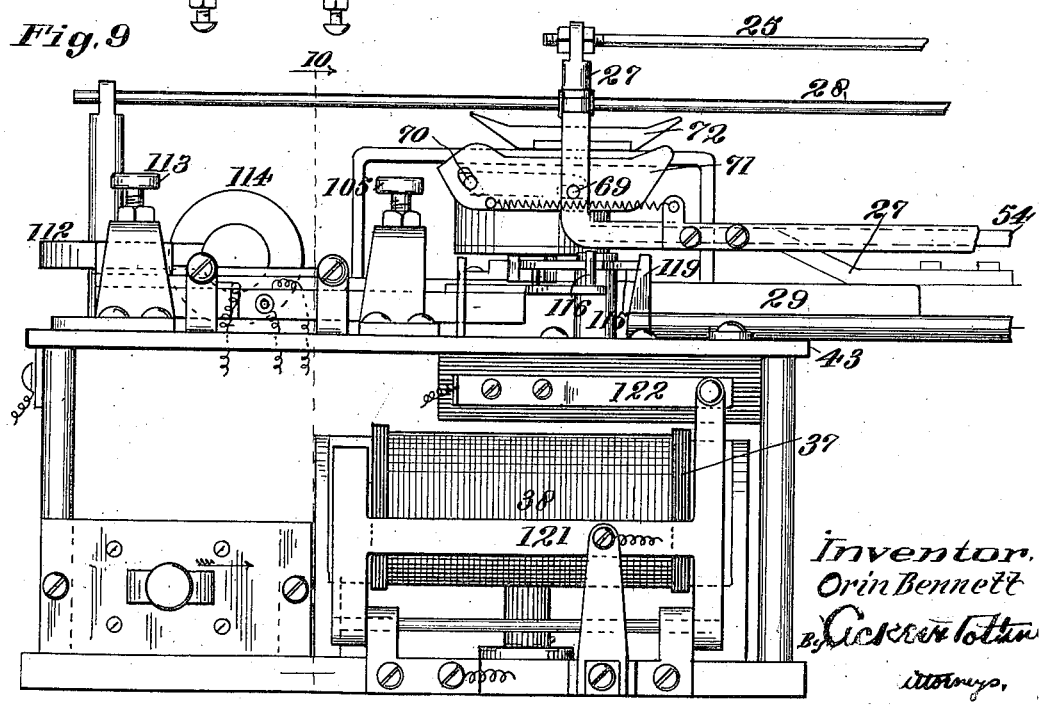
Fig. 9 is a front elevation of the selecting mechanism, showing also the oscillating motor for operating the same.

The gear 30 is rotated, with an intermittent motion, by an oscillating motor 37, Figs. 9, 10 and 11, comprising a field coil 38 and an armature 39. A cross bar 40 is secured to the shaft of said armature, and operates slides 41 and 41', Figs. 10 and 11, which have lugs 42 and 42', respectively, projecting upwardly through plate 43 which separates the motor 37 from the mechanism above. Said slides are thus reciprocated by the oscillation of the motor armature 39. A pair of spring retained pivoted arms 44, Figs. 10, 11 and 12, acting against a radial lug 45 projecting from the armature 39, normally hold said armature in the position shown.

Figure 6:
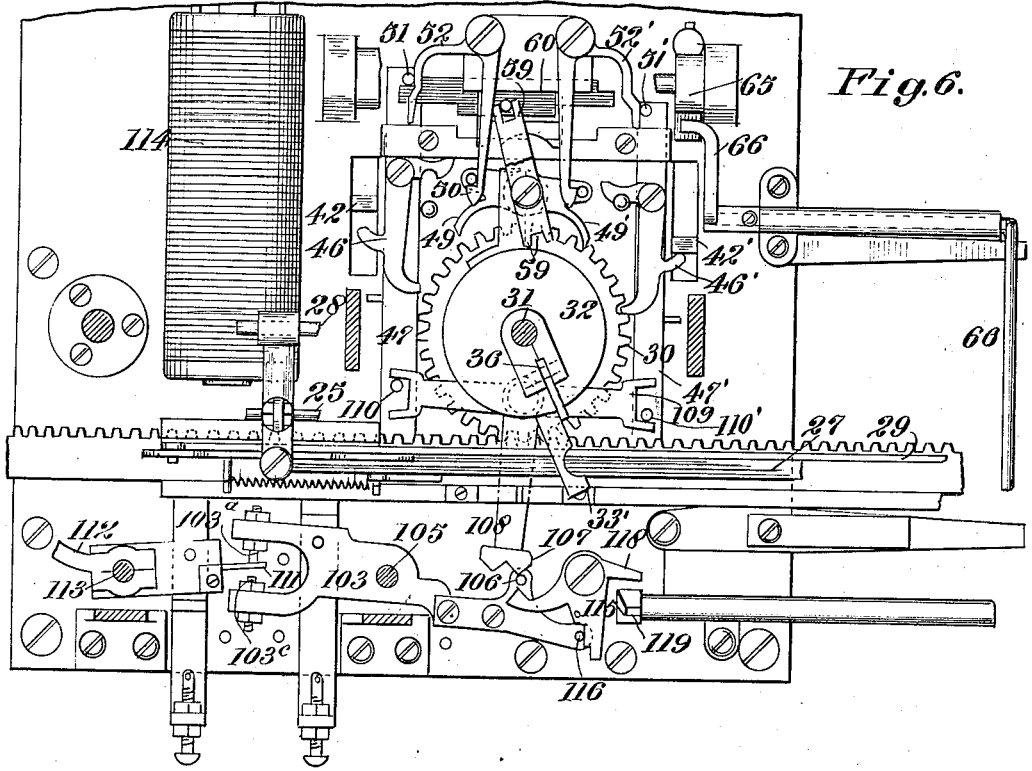
Figs. 6, 7 and 8 are plan views of the selecting mechanism, the parts being shown in two different operative positions in Figs. 6 and 7 and in normal or inoperative position in Fig. 8.
Figure 7:
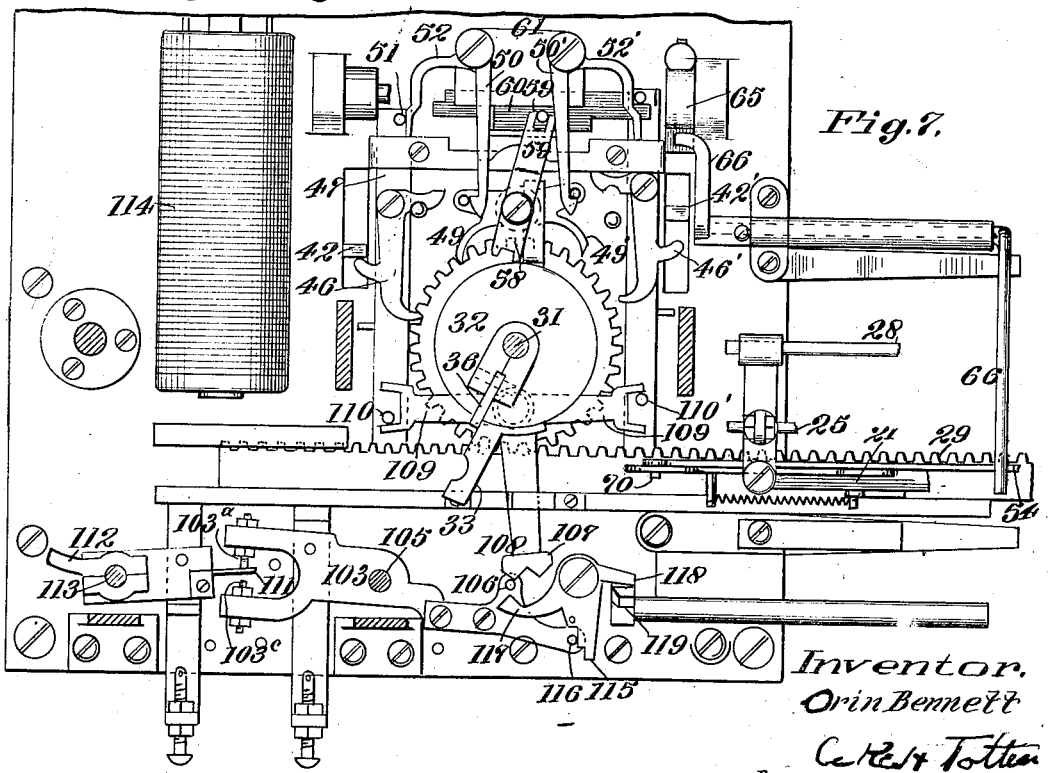
Figure 8:
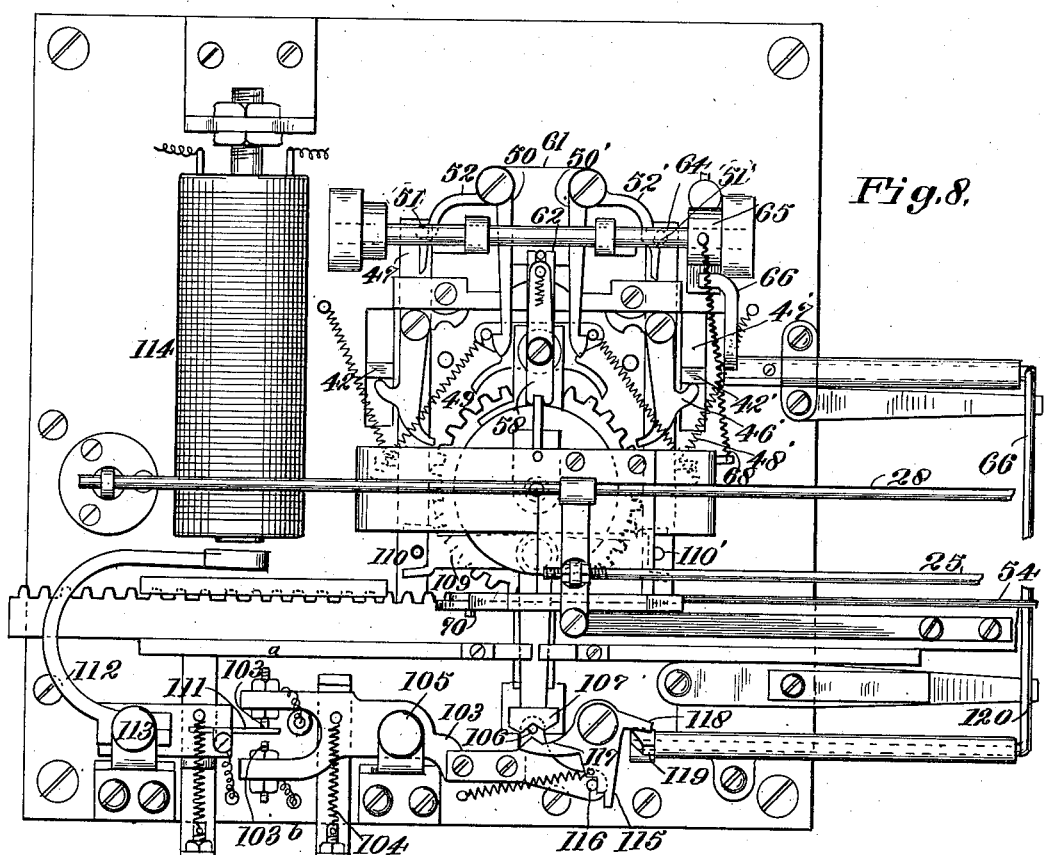

The lugs 42 and 42', projecting through the plate 43, operate against dogs 46 and 46', Figs. 6, 7, 8 and 10, which are pivotally mounted on the respective sliding bars 47 and 47', said dogs being adapted for engagement with the teeth of the gear 30. Thus if the motor armature 39 is oscillated counter-clockwise from the position shown in Fig. 11, the dog 46 is caused to engage the gear 30, as in Fig. 7, and turns said gear the distance of one tooth. When the motor armature 39 returns to its normal position, the dog 46 is returned by a spring 48, Fig. 8, secured to the sliding bar 47, but the gear 30 is retained in its advanced position by a pawl 49, Fig. 7. Said pawl is normally held out of engagement with the gear 30 by a latch 50, as in Fig. 6, but said latch is operated to release the pawl 49 by a pin 51 projecting from the sliding bar 47 which engages an arm 52 secured to said pawl, as shown in Fig. 7. The pawl, when thus released, is drawn into engagement with the gear 30 by the spring 53 shown in Fig. 8. This escapement mechanism is also illustrated in Figs. 17 and 18.

The parts described above are duplicated on the right hand side of the gear 30, as shown, and are numbered correspondingly, being distinguished from those on the left by the addition of the prime mark to each. Thus a clockwise oscillation of the motor armature 39 from its central position, causes a clockwise rotation of the gear 30. The direction of oscillation of the motor armature is controlled by the key switches 15 and 15', in a manner to be later described.

Thus if a key to the right of the center is depressed, the switch 15 is closed, and the motor armature oscillates counter-clockwise, thus rotating the gear 30 counter-clockwise, and moving the rack 29 and the key-depressing cam 23 to the right; and if a key to the left of the center is depressed, the parts are moved in the opposite direction, carrying said cam 23 to the left.

This movement of the gear 30, shifting the cam 23 to the right or left as the case may be, continues in a succession of steps, the motor 37 being de-energized and its armature returned to its central position after each step. The movement of the rack 29 and its associated member 27, Figs. 8 and 9, also carries with it a rod 54, which extends beneath the key bars 4, and is attached to a slide 55, Figs. 2 and 3, operating on a pair of fixed guide rods 56, and carrying a spring contact point 57 which is adapted to make electrical contact with the key bar 4, which has been initially partially depressed by the operator, when the cam 23 is directly over said key bar. This contact completes certain circuits, to be later described, and causes the printing solenoid 21 to operate, thereby rotating the square shaft 17 and causing the cam 23 to fully depress the said key bar, thus completing the printing operation. At the same time, the current to the motor 37 is reversed, causing the armature to make one oscillation in the reverse direction. This results in freeing the gear 30, which is then returned by its spring 34 to its normal position, carrying the cam 23 and the contact point 57 back to their central, or normal positions. This freeing of the gear 30 is effected in the following manner.

The radial arm 36, Figs. 6, 7, 8, and 10, which is secured to the gear shaft 31, in its normal position engages a lever 58, which is secured, by means of the rotatable pin 35, to a lower lever 59, as shown most clearly in Fig. 18. Said lower lever 59 operates a transverse slide 60, whose ends are adapted to be moved into the paths of the pins 51 and 51' of the sliding bars 47 and 47', as shown in Figs. 6, 7, and 16. Thus when the gear 30 is turned counter-clockwise, as in Fig. 7, the levers 58 and 59 shift the slide 60 to the right, so that its right hand end lies in front of the path of the pin 51' of the sliding bar 47'. During this movement said bar 47' has been stationary, as the motor 37 has been oscillating counter-clockwise, and operating the gear 30 through the sliding bar 47.

The cross slide 60 is carried in a member 61, Figs. 6, 7, 8 and 16, which is movable fore and aft, and which carries the pawl retaining latches 50 and 50'. Therefore when the motor 47 is reversed by the contact of the point 57 with the partially depressed key bar, the sliding bar 47' is moved forward, drawing with it the latch carrying member 61, and causing the latches 50 and 51 to engage both pawls 49 and 49'. Then upon the return movement of the motor armature to its normal position, which occurs at the completion of the printing operation, said member 61 moves rearwardly again to its normal position, and lifts said pawls from the gear 30, thereby allowing the latter to be returned to its normal position by its spring 34. A spring 62, Figs. 8 and 10, holds the lever 58 and the slide 60 in their off-center position when said lever is freed by the arm 36.

The mechanism described in the preceding paragraph is inter-connected with the mechanism of the printing solenoid 21 and its shiftable cam 23 in such a manner that the latter cannot operate until released by the initial forward movement of the pawl carrying member 61, which movement is caused by the reversal of the motor 37. For this purpose the member 61 is secured to a pair of spaced levers 63, Figs. 10 and 16, which are fixed upon an over-lying shaft 64. A cam 65, Figs. 6, 7, 8 and 16, is also fixed upon said shaft, and said cam operates a trigger 66, as shown in Figs. 1, 6, 7, 8 and 25, whose end portion normally acts as a lock for a lever 67, Figs. 1, 2 and 26, secured upon the left hand end of the square shaft 17. Thus when the member 61 is drawn forward, the trigger 66 releases said square shaft 17, allowing it to be rotated by the printing solenoid 21 to cause the previously positioned cam 23 to fully depress the desired key and complete the printing operation. A spring 68, Fig. 8, returns the member 61 to its normal position.

The spring contact point 57, which makes contact with the partially depressed key bar, is shifted, to the right or left from its central position, with the cam 23, as described above.

In order to prevent said contact point 57 from interfering with the final and full downward movement of the key bar with which it has made contact, it must be caused to lag slightly behind the cam 23, when moved in either direction, so that it will not be directly beneath the key bar, as shown in Fig. 5, but such lag must not be great enough to prevent said contact point from touching said key bar. For this purpose, the shifting rod 54 of the contact point 57 has a slotted connection with the member 27, as shown at 69, in Figs. 9, 22 and 23, and is provided with a pin 70 which operates in an inclined slot in a rocking member 71 pivotally connected with the member 27 at said point 69. Said rocking member 71 is engaged by a fixed cam 72, Figs. 9, 10, 22 and 23, in such a manner that when the member 27 moves to the right, the rocking member will be depressed at its left hand end, as shown in Fig. 23, thereby forcing the pin 70 to the upper and left hand end of its slot, and shifting the rod 54 slightly to the left with respect to the member 27. This causes the contact point 57 to lag slightly behind the cam 23, which latter is moved directly by the member 27 through the connecting rod 25. When the member 27 moves to the left, the left hand end of the rocking member 71 will be raised, thereby causing the pin 70 to move to the lower and right hand end of its slot, thereby shifting the rod 54 slightly to the right with respect to the member 27, and again causing the contact point 57 to lag slightly behind the cam 23.

The carriage controlling slide 8, Figs. 2 and 28, which is drawn forward by the complete depression of any key, and is returned upon the release thereof, advances the carriage 2 in the usual manner, which may be briefly described as follows, with particular reference to Figs. 28 and 32. A bellcrank lever 73, Fig. 32, is connected at one end with the slide 8, at 74, and its other end is connected with a transversely movable dog 75 provided with teeth 76 adapted to engage the similar teeth of a ratchet 77 secured to the carriage 2, said ratchet being shown in dotted lines. A spring held retaining pawl 78 also engages said ratchet. Thus when the slide moves forward, or in the direction of the arrow in Fig. 32, the dog 75 is moved to the left, and when said slide subsequently returns, said dog 75 is moved to the right, carrying the ratchet 77 with it and advancing the carriage one step. The pawl 78 retains said carriage in its new position.

In order to return the carriage 2 at the end of a line, I provide a drum 79, Fig. 31, operated by a spiral spring 80, and having a cord 81 wound upon it, the free end of said cord being secured to the carriage at 82. The mechanism described in the preceding paragraph advances the carriage against the action of said spring 80, and in order to free said advancing mechanism from the ratchet 77, to allow said spring to return the carriage, I provide an additional key 83, Fig. 1, at the center of the key board. This carriage release key 83 moves the slide 8 forwardly further than any of the other keys, through mechanism to be presently described, thereby causing the finger 73' of the bell-crank 73, Fig. 32, to engage the dog 75, lifting its teeth 76 clear of the ratchet 77. Said dog 75 also engages the pawl 78 and lifts it clear of said ratchet, so that the carriage is then free to be returned by the spring 80. At the same time, the slide 8 is held in its extreme forward position by a spring actuated latch 84, Figs. 28, 31, 33 and 34, which drops behind the rear end of said slide, as shown in Fig. 34, and remains in such position until raised by a lug 85, Fig. 31, secured to the carriage 2, said lug engaging and raising the latch 84 when the carriage is fully returned.

The forward movement of the slide 8, when actuated by any key except the carriage release key 83, is so limited that the latch 84 cannot drop behind its rear end. The forward end of said slide abuts against a shiftable bar 86, Figs. 28 and 29, which, in turn, engages and moves a swinging contact arm 87, causing the latter's contact point 88 to connect with a stationary contact 89, as shown in Fig. 29. These contacts 88 and 89 thus limit the normal forward movement of the slide 8. The electrical connection established between them also causes the release of the selecting mechanism, in a manner to be described later. The carriage release key 83, Fig. 2, is mounted on a bar 90, which is fulcrumed at 91 and has a lug 92 adapted to engage the bar 4' of the space key 5'. Said space key, of course, operates the slide 8 in the usual manner, as described above, to advance the carriage, although it does not actuate the type wheel 6. The carriage release key bar 90 extends downwardly, and operates a system of levers and links 93 Figs. 2, 3 and 28, which connect with the shiftable bar 86 and cause the latter to move to the left, when said release key 83 is depressed, as shown by the dotted lines in Fig. 28. This causes the end of the slide 8 to abut against said shiftable bar 86 at its cut-away portion 94, as shown in Fig. 30, thereby allowing said slide to move sufficiently far, before being stopped by the closing of the contacts 88 and 89, to permit the latch 84 to drop behind its rear end and to free the dog 75 and the pawl 78, Fig. 32, from the carriage ratchet 77.

The movement of the carriage release key bar 90 also operates a contact arm 95, Figs. 2, 3 and 28, therby closing the contacts 96 and 97, and energizing a circuit which includes a solenoid 98, Figs. 1, 2 and 31. The downward movement of the core 99 of said solenoid 98, as shown in Fig. 2, causes a partial rotation of the platen 3 by means of the link 100 and the ratchet mechanism indicated at 101. Thus the depression of the carriage release key 83 causes both the return of the carriage and the rotative advancement of the platen to a new line.

The mechanical construction and operation of the sending machine have now been fully described. The construction of the receiving machine is, of course, identical with that of the sending machine described above, and its operation is similar, except that the keys of the receiving machine are not initially partially depressed by the operator, the control of its selecting mechanism being derived from the key-board of the sending machine. I shall now described the various electric circuits and connections through which both machines are operated, with particular reference to the inter-dependence, mentioned above existing between the selecting mechanism of the two machines, by means of which the possibility or error is reduced to a minimum.

Each machine is provided with a master switch 102, Figs. 11 and 35, by means of which it may be adapted for either sending or receiving. The contacts of said switch are shown in the sending position in Fig. 35. The selecting mechanism of each machine has associated with it a contact lock comprising a rocking bar 103, Figs. 6, 7, 8 and 9, which is normally held in the position shown by a spring 104 Fig. 8. Said bar is pivotally mounted at 105, and at one end has two spaced contacts $103^a$ and $103^b$. At its other end said bar has a pin 106, which is adapted to be engaged by a cam 107 carried upon the end of an arm 108. Said arm extends from a transverse lever 109, Figs. 6, 7, 8 and 15 which is pivotally mounted at its center and has forked ends adapted to be engaged by pins 110 and 110' rising respectively from the sliding bars 47 and 47' of the selecting escapement mechanism. Thus when either of the sliding bars 47 or 47' moves forwardly, the cam 107, acting against the pin 106, rocks the bar 103, as shown in Figs. 6 and 7.

A movable contact blade 111, Fig. 8, lies between the contacts $103^a$ and $103^b$, and normally connects with the former. Said blade 111 is carried by an arm 112, which is fulcrumed at 113, and whose end portion is positioned to be attracted by an electro-magnet 114. When said arm 112 is so attracted, the rocking bar 103 is moved into the position shown in Figs. 6, 7, and 13, and is held in such position by the engagement of a spring actuated latch 115 with a pin 116 secured in said rocking bar. Said latch 115 has two arms by which it may be released from the pin 116. One of said arms, 117, is adapted to be engaged by the cam 107, as shown in Fig. 13 and the other, 118, is adapted to be engaged by a trip 119, Figs 8, 9 and 24, which is actuated by a lever 120 lying in the path of movement of the crank arm 67 carried by the left hand end of the square printing shaft 17, as shown in Figs 1, 2 and 26.

The field magnet 38 of the oscillating motor 37 operates a movable contact arm 121, Figs. 9, 10, 11 and 27, causing it to connect with a stationary contact 122. There are also provided a line cut-off relay 123 and a reversing relay 124, Figs. 1 and 35, whose functions will be described presently. The sending and receiving machines are connected by a single pair of wires, not shown in the drawings, which run from the connections or binding posts 125 and 125', Fig.

35, to the corresponding binding posts of the receiving machine. Each machine is further provided with two other pair of binding posts 126 and 126', and 127 and 127'. A suitable source of current, not shown, is connected with each such pair of binding posts of each machine. For convenience in reference, the current supplied through the binding posts 126 and 126' will be termed the primary current, and that supplied through the binding posts 127 and 127' the secondary current. The primary current of the sending machine is used to excite the line connecting the sending and receiving machines, whereas the secondary current is used locally in each machine. The secondary current of one machine is of opposite polarity to that of the other machine, for a purpose to be hereinafter set forth.

When a key of the sending machine is partially depressed, supposing such key to be on the right hand side of the key board, the key switch 15 is operated as described above. This permits a current to flow from the primary current source through the following circuit of the sending machine, as shown in Fig. 35, from the binding post 126 through the wire 128 to the key switch 15, thence through the contacts 14 and 16, which are understood to have been closed by the partial depression of the key, thence through the wire 129 and the contacts 124$^a$ and 124$^b$ of the reversing relay 124, said contacts being normally closed, thence through the wire 130 and the contacts 102$^a$ and 102$^b$ of the master switch 102, which is in the sending position as shown, thence through the wire 131 and the contacts 123$^a$ and 123$^b$ of the line cut-off relay 123, said contacts being normally closed, thence through the wire 132 to the lock contact blade 111, thence to the lock contact 103$^a$, which is normally in contact with said blade 111, thence through the wire 133, the contacts 102$^c$ and 102$^d$ of the master switch, the wire 134, the lock magnet 114, and the wires 135 and 136 to the line binding post 125. The lock magnet 114, being thus energized, attracts the arm 112, thereby moving the rocking bar 103, into the position shown in Fig. 13, said bar 103 being retained in this position by the latch 115. Contact between the blade 111 and the point 103$^a$ is maintained as long as current continues to flow through said magnet 114.

From the binding post 125, Fig. 35, the circuit includes the line, not shown, and the receiving machine, the current returning to the sending machine at the binding post 125'. The remainder of the primary circuit then includes the wire 137, the contacts 124$^c$ and 124$^d$ of the reversing relay 124, the wire 138, the contacts 14$^a$ and 16$^a$ of the key switch 15, the wire 139, the binding post 126', and thence to the source of current, not shown. It will be seen that nothing in the sending machine is directly operated by the completion of the above described circuit except the contact lock 103.

Turning now to the receiving machine, and regarding Fig. 35 as applying thereto, the primary current from the sending machine enters from the line at the binding post 125, and flows through a circuit comprising the wires 136 and 140, the contacts 102$^e$ and 102$^f$ of the master switch 102, which is understood to be set in a position opposite to that shown, the wire 141, the field coil 38 of the oscillating motor 37, the wire 142, the contacts 102$^g$ and 102$^c$ of the master switch 102, the wire 133, the contacts 103$^a$ and 111 of the lock, the wire 132, the contacts 123$^b$ and 123$^a$ of the line cut-off relay 123, the wire 131, the contacts 102$^b$ and 102$^h$ of the master switch 102, the wire 143, and the binding post 125', from which the line, not shown, runs back to the sending machine. Still referring to the receiving machine, the energizing of the motor field coil 38 closes the contacts 121 and 122, which completes the secondary circuit as follows:— from the source of supply, not shown, the secondary current enters at the binding post 127, thence through the wire 144, the motor armature 39, the contacts 122 and 121, the wire 145, the printing solenoid 21, the wire 146, the binding post 127', and thence to the source. Thus both the field and the armature of the motor 37 are energized, and the armature makes one movement. On account of the relative directions of the primary, or field current, and the secondary, or armature current, this movement is counter-clockwise as viewed in Fig. 11, which moves the sliding bar 47, Fig. 7, forwardly, and rotates the gear 30 and moves the rack 29 one step to the right. This movement of the sliding bar 47 also operates the lever 109 and its associated cam 107, which moves the right hand end of the rocking bar 103 forward, thereby separating the contacts 111 and 103$^a$ and breaking the primary circuit, whereupon the motor field 38 is de-energized and the armature 39 returns to its normal position.

This opening of the primary circuit also de-energizes the lock magnet 114 of the sending machine, allowing its armature 112 to return, thereby causing the contact blade 111 to break its connection with the contact 103$^a$ and to make connection with the contact 103$^b$, the rocking bar 103 being still held by the latch 115. This completes a new local primary circuit in the sending machine comprising the binding post 126, Fig. 35, the wire 128, the key switch contacts 14 and 16, the wire 129, the reversing relay contacts 124$^a$ and 124$^b$, the wire 130, the master switch contacts 102$^a$ and 102$^b$, the wire 131, the line cut-off relay contacts 123$^a$ and 123$^b$, the wire 132, the lock contacts 111 and 103$^b$, the wires 147 and 142, the motor field coil 38, the wire 141, the master switch contacts 102$^f$ and 102$^i$, the wires 143 and 137, the reversing relay contacts 124$^c$ and 124$^d$, the wire 138, the key switch contacts 14$^a$ and 16$^a$, and the wire 139 to the binding post 126'. This circuit energizes the motor field coil 38, giving it a polarity opposite to that of the receiving machine in the first mentioned primary circuit, and closing the contacts 121 and 122, thereby completing a secondary circuit in the sending machine similar to the secondary circuit of the receiving machine described above, except that the polarity of the source of current is reversed, as before stated. This secondary circuit of the sending machine includes its motor armature 39, which on account of the reversed polarity of both field and armature currents, responds in a manner similar to that of the receiving machine, moving the rack 29 one step to the right.

The contact lock 103 of the sending machine, however, is in a different position from that of the receiving machine when the latter's motor was operated. Said lock 103 of the sending machine, as described above, has been held in the position shown in Fig. 13 by the latch 115, so that the pin 106 is not engaged by the cam 107. The movement of said cam, which is caused by the operation of the motor, therefore causes it to engage the arm 117 of said latch 115, thereby releasing the bar 103, and causing its contact 103$^b$ to break connection with the contact 11 and its contact 103$^a$ to again make connection with said contact 11. This opens the local primary circuit of the sending machine, allowing its motor armature to return to its normal position, and re-establishes the original primary circuit including the line and the motor of the receiving machine, which thereupon operates as before to advance its rack 29 a second step.

Thus it will be seen that the selecting mechanism of the receiving machine, actuated by its oscillating motor 37, is operated in a step-by-step movement through the completion of the original primary circuit by the initial partial depression of a key on the sending machine, and that each forward step movement of said receiving selecting mechanism causes a similar movement of the sending machine selecting mechanism, through the breaking of the original line circuit and the completion thereby of a local primary circuit in the sending machine, and that the said movement of the sending selecting mechanism causes another step movement of the receiving selecting mechanism, through the restoring of the original primary line circuit.

When the selecting mechanism of the sending machine has operated a sufficient number of steps to cause its spring contact point 57, Fig. 3, to make contact with the initially partly depressed key bar 4, the reversing relay 124, Fig. 35, is operated by means of a circuit connected with the primary source of current and comprising the binding post 126, the wire 128, the key switch contacts 14 and 16, the wire 129, a ground connection on the frame of the machine at 148, the key bar 4, which, of course, is grounded, the spring contact 57, a wire 149, a pair of contacts 121$^a$ and 122$^a$ which are closed by the attraction of the member 121 by the motor field magnet 38, (and which are shown only in Fig. 35), a wire 150, the reversing relay magnet 124, the wires 151 and 138, the key switch contacts 14$^a$ and 16$^a$, and the wire 139 to the binding post 126'. The energizing of the reversing relay 124 closes a pair of holding contacts 124$^e$ and 124$^f$, which shunt the spring contact 57 and the motor field contacts 121$^a$ and 122$^a$, thereby causing said relay to remain energized until the key switch 15 is opened. The energizing of said reversing relay also reverses the direction of the primary currents through the line and the motor field coils 38 of both machines, by making connection between contacts 124$^a$ and 124$^g$, and between contacts 124$^d$ and 124$^h$. The other portions of the primary circuits remain as described above.

When the first reversed primary circuit is established by the reversing relay 124, the motor field coil 38 of the receiving machine is given a polarity opposite to that which it had when operating to advance the rack 29 as described above. The polarity of its armature 39, however, remains the same as before, so that said armature moves in an opposite direction, or clockwise as viewed in Fig. 11. This moves the sliding bar 47', Fig. 7, forwardly, causing its pin 51' to engage and move the slide 60 and the latch carrying member 61. This actuates the cam 65 and causes the trigger 66 to release the square printing cam shaft 17, Fig. 3. Said shaft is then partially rotated by the printing solenoid 21, which is energized at this time by the secondary current. The cam 23, having been positioned over the proper key by the previous movement of the rack 29, thereupon fully depresses said key, completing the printing operation in the receiving machine.

At the end of the downward movement of the selected key bar, the carriage controlling slide 8, Fig. 28, operates to close the contacts 88 and 89, as previously described. This energizes the line cut-off relay magnet 123, Fig. 35, of the receiving machine, said relay magnet being connected by a wire 152 with the incoming line wire 143, and by a wire 153 with the contact 88. The other contact 89 is connected by a wire 154 with the wire 130, from which the current flows as previously described to the other line binding post 125. The operation of said line cut-off relay 123 closes a pair of holding contacts 123$^c$ and 123$^d$, and opens the contacts 123$^a$ and 123$^b$. Said holding contacts shunt the contacts 88 and 89, and cause said relay to remain energized until the key-switch 15 of the receiving machine is opened. The opening of the contacts 123$^a$ and 123$^b$ breaks the primary line circuit, de-energizing the motor, and permiting its armature to return to its normal position. The return movement of the latch carrying member 61, Fig. 8, permits the gear 30 and the rack 29 to return, the latter carrying with it the key depressing cam 23 and the spring contact 57. It is necessary to provide the line cut-off relay 123 to open the line circuit, for the reason that the above described reversed action of the motor armature 39 does not move the sliding bar 47', Fig. 8, sufficiently far forward to enable it to operate the cam 107, on account of the operation of the latch carrying member 61. The lock member 103, therefore, is not moved, as it was in the first described operation of the motor, and the contacts 111 and 103$^a$ remain connected. Moreover, the primary line circuit must remain open, to prevent further operation of the receiving machine motor, until the sending machine has completed its printing operation.

All parts of the receiving machine are thus returned to their normal positions, one letter having been printed. The breaking of the primary circuit by the line cut-off relay 123 also releases the lock contact 11 of the sending machine, thereby re-establishing the local primary circuit in said sending machine as described above, except that the direction of the current has been reversed by the action of the reversing relay 124. This causes the motor armature of said sending machine to operate in the reverse direction, thereby completing the printing operation and returning all parts to their normal positions in a manner exactly similar to that of the receiving machine described above. The lock member 103 of the sending machine, however, is held by the latch 115 as before, as shown in Fig. 13, but the cam 107 is not actuated by the reversed action of the motor, said latch being released instead by the trip 119, which is actuated by the square printing shaft 17 through the crank 67 and the arm 120 as previously described. This restores the lock member 103 to its original position.

The printing operation of the sending machine, which involves the automatic full depression of the key which has been initially partly depressed by the operator, returns said key to its normal position, thereby breaking the contacts 14 and 16 and 14$^a$ and 16$^a$ of the switch 15, which releases the reversing relay 124 of the sending machine and the line cut-off relay 123 of the receiving machine. Both machines are therefore restored to their original normal positions, ready for the partial depression of another key of the sending machine. If such key be on the left of the center of the keyboard, instead of on the right, as described above, the key switch 15' is operated in place of the key switch 15. When the contacts 14' and 16', and 14$^{a'}$ and 16$^{a'}$, Fig. 35, of said switch 15' are closed, the primary circuits, both the initial line circuit and the subsequently completed local circuit of the sending machine, are established as described above except that the direction of the current is reversed. This can be easily seen by reference to Fig. 35 without repeating the complete description of said circuits. The direction of the current in the secondary circuits remains the same as before. Therefore, the polarity of the field coils 38 of both motors being opposite to that described in the first instance, said motors perform all their operations in the opposite direction, thereby moving the key depressing cams 23 to the left to operate the selected keys.

The circuit of the platen solenoid 98 may be traced from the secondary binding post 127, Fig. 35, through a wire 155, the platen solenoid 98, the contacts 96 and 97, and the wires 156 and 146 to the binding post 127'. Said solenoid is therefore only energized when the contacts 96 and 97 are closed by the operation of the carriage return key 83, Fig. 2, as previously described.

Condensers 157 and 158, Figs. 1 and 35, are preferably included in the circuits as shown in said Fig. 35, the condenser 157 being connected across the contacts 121 and 122. The condenser 158 is connected across the lock contacts 111 and 103$^b$ by the master switch contacts 102$^j$ and 102$^k$, when said master switch is in the sending position as shown, and across the lock contacts 111 and 103$^a$ by the master switch contacts 102$^j$ and 102$^l$ when in the receiving position.

A brief recapitulation of the operation of the machine in printing a single letter will now be given. It should be borne in mind that the actual printing operation in both machines is accomplished through the agency of the usual and well known mechanism, employed in typewriters of the type described, for connecting the key bars with the type wheel, whereby said type wheel is first rotated to the proper point and then depressed upon the platen by the movement of any given key bar. The electrically controlled and operated devices, which are included in the present invention, act upon the usual key bars of the typewriters, and, by selectively and fully depressing said key bars, cause the letters to be printed. For the sake of simplifying the drawings and the foregoing description, the said well known connections between the key bars and the type wheel have been omitted as forming no part of the present invention, it being understood that the complete depression of any given key bar causes the printing of the letter corresponding to that key bar.

When any given letter is to be printed, the operator at the sending machine slightly depresses the key 5 corresponding thereto. This initial depression of the key and its bar 4 is insufficient to cause any effective movement of the type wheel 6, but operates the key switch 15 or 15', depending on whether the slightly depressed key is on the right or left of the center. Assuming that the slightly depressed key is on the right of the center, the operation of the switch 15 results in the series of successive electrical impulses described above and which actuate the selective mechanisms of both machines, and said selective mechanisms cause the sliding contact points 57 and the cams 23, Figs. 2 and 3, to move, toward the right from their normal central position, in a step-by-step movement, until the contact point 57 of the sending machine touches and makes connection with the slightly depressed key bar. This latter electrical connection, between the contact point 57 and the slightly depressed key bar 4, first stops the selecting mechanisms of both machines, and then actuates the printing solenoids 21, which rotate the bar 17 and the cams 23 in the manner described above. The cam 23 of the sending machine has been positioned, by its selecting mechanism, above the slightly depressed key bar, and the cam 23 of the receiving machine is likewise positioned above the corresponding key bar of that machine; so that when said cams are rotated by their respective printing solenoids 21, the slightly depressed key bar of the sending machine and the corresponding key bar of the receiving machine are fully depressed, by said cams, with the result that the same letter is printed by both machines. The contact points 57 and the cams 23 are then automatically restored to their normal positions. If the operator slightly depresses a key to the left of the center, the key switch 15' is operated, and the cam 23 and contact point 57, in each machine, are moved to the left until the bar of said key is reached, whereupon said bar is depressed as before.

The selecting mechanism, as described in detail earlier in this specification, is so constructed that each electrical impulse causes the cam 23 and the contact point 57 to advance a distance equal to the space between adjacent key bars. Therefore the number of impulses necessary to select any given letter will depend on the distance between the center of the key board and the key bar corresponding to that letter. The impulses succeed each other automatically, and continue until the contact point 57 of the sending machine reaches the slightly depressed key bar. For example, if the key carried by the eighth bar to the right of the center is initially depressed by the operator, the selecting mechanisms of both machines will be energized eight successive times before the printing mechanism is actuated, and so on. In any case, the continuance of operation of the selecting mechanism depends upon the initially depressed key being retained in its partially depressed position until it is further depressed by the cam 23, for if said key is prematurely released, the switch 15 (or 15' as the case may be) is opened, with the result that the selecting mechanisms of both machines are returned to their normal positions without any operation of the cams 23. In actual practise, the time required for the cam 23 and the contact point 57 to travel even to the extreme end of the bank of key bars is very short, the electrical impulses following each other very quickly.

It should be noted that the operation of the selecting mechanism of the sending machine is not controlled directly by its own keyboard, but through the agency of the selecting mechanism of the receiving machine, so that the sending machine must follow, rather than lead, the receiving machine and thereby give the sending operator a check on the operation of the receiving machine. For example, if any given key bar to the right of the center is initially depressed by the sending operator, an electrical impulse is sent over the line which energizes the selecting mechanism of the receiving machine, causing its cam 23 to advance one step toward the right; this also causes the contact lock 103 of the receiving machine to open the line circuit, and this opening of the line circuit actuates the contact lock 103 of the sending machine, thereby causing the selecting mechanism of said sending machine to receive an impulse which causes its cam 23 and contact point 57 to also advance one step to the right, and at the same time restores the original line circuit, so that the receiving machine is again energized, and the operation is repeated successively until the contact point 57 of the sending machine reaches the initially depressed key bar, whereupon said key bar and the corresponding key bar of the receiving machine are both fully depressed by the respective printing mechanisms.

I claim:—

1. A telegraphic typewriting system including a sending and a receiving typewriter, each provided with a key board and a printing mechanism, electrically actuated mechanism connecting said typewriters, whereby the depression of a key of the sending typewriter causes the operation of the printing mechanism of the receiving typewriter, which latter operation subsequently causes the operation of the printing mechanism of the sending typewriter, and switches within said electrical mechanism for changing said sending typewriter to a receiving typewriter and vice versa.

2. A telegraphic typewriting system including duplicate typewriters, each provided with a printing mechanism and a key board, electrically actuated mechanism associated with each for operating their respective printing mechanism, an electric circuit connecting said mechanisms, means therein for selectively operating either of said typewriters as a receiving or transmitting typewriter, and a circuit interconnecting the said members whereby on the operation of the key board of the sending typewriter the current travels from said typewriter to operate the printing mechanism of the receiving typewriter and returns therefrom on the operation of said printing mechanism to operate the corresponding printing mechanism of the sending typewriter.

3. A telegraphic typewriting system including duplicate typewriters each provided with a printing mechanism and a key board, of means operatively connecting said typewriters, whereby the transmitted message is printed on the transmitting typewriter as printed by the receiving typewriter.

4. In a system of the class described, duplicate typewriters each provided with a key board and a printing mechanism, a key bar operating cam movable into cooperative relation with any key bar of the entire board, an electric contact movable with said cam into contact with the selected key, and an electrical member for operating said cam on the engagement of said contact with the bar of the selected key.

5. In a system of the class described, duplicate typewriters each provided with a key board and a printing mechanism, of a key bar operating cam movable into cooperative relation with any bar of the entire key board, a motor for selectively moving said cam over the bars of the key board, a shaft on which said cam moves, and means for operating said cam to actuate the type bar on said cam registering with the bar selected.

6. In a system of the class described, duplicate typewriters each provided with a key board and a printing mechanism, of a key bar operating cam movable into cooperative relation with any bar of the entire key board, a motor for selectively moving said cam over the bars of the key board, a shaft on which said cam moves, and a solenoid associated with the shaft for actuation to operate the cam on the same registering with the selected key of the board.

In testimony whereof I have signed my name to this specification.

ORIN BENNETT.